United States Patent
Chen (10) Patent No.: US 8,081,175 B2
(45) Date of Patent: Dec. 20, 2011

(54) DISPLAY PANEL AND ITS APPLICATION

(75) Inventor: Chi-Wen Chen, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 1027 days.

(21) Appl. No.: 11/941,579

(22) Filed: Nov. 16, 2007

(65) Prior Publication Data

US 2009/0027319 A1   Jan. 29, 2009

(30) Foreign Application Priority Data

Jul. 23, 2007   (TW) ............................... 96126745 A (51) Int. Cl.
 *G09G 5/00* (2006.01)
(52) U.S. Cl. .......................................... 345/207; 345/87
(58) Field of Classification Search .................... 345/30, 345/55, 84, 87, 204, 207; 250/200, 201.1, 250/336.1, 372
 See application file for complete search history.

(56) References Cited

U.S. PATENT DOCUMENTS

| | | | |
|---|---|---|---|
| 5,157,525 A | 10/1992 | Eaton et al. | |
| 5,453,611 A | 9/1995 | Oozu et al. | |
| 6,163,309 A * | 12/2000 | Weinert | 250/336.1 |
| 6,541,775 B2 | 4/2003 | Yagi | |
| 6,809,718 B2 | 10/2004 | Wei et al. | |
| 7,227,153 B2 * | 6/2007 | Yagi | 250/372 |
| 7,515,149 B2 * | 4/2009 | Kerr et al. | 345/207 |
| 2004/0113044 A1 | 6/2004 | Ishiguchi | |

FOREIGN PATENT DOCUMENTS

| | | |
|---|---|---|
| JP | 2007140436 | 6/2007 |
| WO | WO 2006/104212 | 10/2006 |
| WO | WO 2006/118028 | 11/2006 |

OTHER PUBLICATIONS

English language translation of WO 2006/104212 (published Oct. 5, 2006).

* cited by examiner

*Primary Examiner* — Regina Liang
(74) *Attorney, Agent, or Firm* — Thomas, Kayden, Horstemeyer & Risley, LLP (57) ABSTRACT

A display panel and its uses are provided. The display panel has several photo-sensors for detecting values of the visible light spectrum of the environmental light and whole light spectrum of the environmental light to obtain a value of the invisible light spectrum. The photo-sensor can be incorporated into an electro-optical device with a display panel.

25 Claims, 7 Drawing Sheets

DISPLAY PANEL AND ITS APPLICATION

This application claims the benefit from the priority of Taiwan Patent Application No. 096126745, filed on Jul. 23, 2007, the contents of which are herein incorporated by reference in its entirety.

CROSS-REFERENCES TO RELATED APPLICATIONS

Not applicable.

BACKGROUND OF THE INVENTION

1. Field of the Invention

The present invention relates to a display device and its manufacturing process and uses. In particular, the invention relates to a display panel comprising a plurality of photo-sensors.

2. Descriptions of the Related Art

Due to the depletion of the ozonosphere over recent years, ultraviolet (UV) rays are less shielded, resulting in an increase in the UV irradiation intensity on Earth. In addition to causing many environmental problems such as abnormal weather, greenhouse effect, reduction of crop yields, and ecosystem imbalance, excessive UV radiation (especially $UV_A$ with a light spectrum ranging from 320 nm to 400 nm and $UV_B$ with a light spectrum ranging from 290 nm to 320 nm) also endangers people's health. For example, UV radiation can (1) cause black spots, freckles and furrows on the skin, (2) lead to premature aging of the skin due to damaged DNA, (3) increase the incidence of skin cancer, (4) decrease vitamin D levels in the body, (5) cause acute keratitis, conjunctivitis and chronic cataracts, and (6) weaken the immune system.

In addition to UV rays, sunlight also comprises infrared (IR) rays with an intense thermal effect that is absorbed by objects for conversion into heat. When human bodies are exposed to the irradiation of IR rays, the absorption of IR rays may cause increased skin temperature, dilation and congestion of capillary vessels, and accelerated moisture evaporation of the epidermis, and thus, harms the skin. Moreover, IR rays may also impair the retina and iris in human eyes and thus, affect eyesight negatively. Even more so, when people are simultaneously exposed to the irradiation of both IR rays and UV rays, the effect of the IR rays will supplement the damaging effect of UV rays.

As a result, people should be immediately aware of the irradiation intensity of the harmful light rays such as UV and IR rays in their living environment (especially under the direct exposure of sunlight). Particularly, in beauty care and medical treatments, knowing the intensity of harmful light rays in the environment is important in deciding when to take protection measures, such as rubbing sun block on the skin, wearing sun glasses, or using sun umbrellas.

To increase awareness of irradiation intensity, a number of sensors have been proposed to detect UV rays. For example, U.S. Pat. No. 6,271,528 discloses a reusable personal light monitor, which utilizes a photostimulable phosphor as a storage medium to absorb the radiation energy of the light with a wavelength of 350 nm or less in the incident light. By using an apparatus with a readout, the radiation energy absorbed by the storage medium is calculated and converted into relevant messages (e.g., UV dose, UV index, etc.), which are then displayed on a panel of the personal light monitor. However, the user must have this personal monitor with him or her at all times to know the radiation intensity of the harmful light rays in the environment. This can be an inconvenience for the user.

To overcome this shortcoming, U.S. Pat. No. 6,541,775 proposes a portable information device capable of displaying UV intensity. It employs silicon carbide or a compound having an element of group III to group V of the chemical elements periodic table as a UV sensor and integrates the UV sensors with a portable device (e.g., a mobile phone, a personal digital assistant (PDA), and etc.). With this device, the user can find the intensity of the UV rays in the current environment via the portable device. However, the UV sensor has a lot of complicated materials, as well as a complicated manufacturing method.

Accordingly, the present invention provides a display panel for measuring and real time reporting a message about the intensity of an invisible light spectrum (such as UV, IR rays, and so on) of environmental light that does not require the use of expensive materials and can produce photo-sensors simultaneously in a thin film transistor (TFT) manufacturing process.

SUMMARY OF THE INVENTION

One objective of the present invention is to provide a display panel comprising:

a first substrate with an active region and at least one peripheral region, said active region comprising a plurality of pixels and each of the pixels comprising at least one switch element electrically connected to a signal line;

a second substrate corresponding to and overlapping the active region so as to expose the peripheral region, and comprising a common electrode thereon;

a display medium with a dielectric coefficient disposed between the first substrate and the second substrate;

at least one first photo-sensor disposed on the peripheral region and composed of a first semiconductor switch element, said first photo-sensor(s) being adapted to detect a whole light spectrum of an environmental light with a visible light spectrum and an invisible light spectrum;

at least one second photo-sensor disposed on the first substrate and composed of a second semiconductor switch element, said second photo-sensor(s) being adapted to detect the visible light spectrum of the environmental light; and a photo-sensing circuit electrically connected to the first photo-sensor(s) and the second photo-sensor(s), said photo-sensing circuit being adapted to obtain a value of the invisible light spectrum (Vi) of the environmental light.

A second objective of the present invention is to provide an electro-optical device comprising a display panel as described above.

A third objective of the present invention is to provide a method for driving a display panel as described above. The method comprises:

irradiating an environmental light on the first photo-sensor(s) of the display panel and the second photo-sensor(s) of the display panel to detect the value of the whole light spectrum (Vw) of the environmental light and the value of the visible light spectrum (Vv) of the environmental light; and calculating the Vw and the Vv to obtain a value for the invisible light spectrum (Vi) of the environmental light and show it on the display panel.

A fourth objective of the present invention is to provide a method for manufacturing a display panel, the method comprising:

providing a first substrate with an active region and at least one peripheral region, said active region having a plurality of pixels, and each of the pixels comprising at least one switch element electrically connected to a signal line;

providing a second substrate corresponding to and overlapping the active region so as to expose the peripheral region, and comprising a common electrode thereon;

disposing a display medium with a dielectric coefficient between the first substrate and the second substrate;

disposing at least one first semiconductor switch element on the peripheral region as at least one first photo-sensor adapted to detect the whole light spectrum of an environmental light with a visible light spectrum and an invisible light spectrum;

disposing at least one second semiconductor switch element on the first substrate as at least one second photo-sensor adapted to detect the visible light spectrum of the environmental light; and providing a photo-sensing circuit electrically connected to the first photo-sensor(s) and the second photo-sensor(s), so as to obtain a value of the invisible light spectrum of the environmental light (Vi).

A fifth objective of the present invention is to provide a method for manufacturing an electro-optical device comprising a method as described above.

In order to the make the aforementioned and other objects, features and advantages of the present invention comprehensible, embodiments accompanied with figures are described in detail below.

DESCRIPTION OF THE PREFERRED EMBODIMENT

The display panel of the present invention is primarily composed of a first substrate, a second substrate, and a display medium with a dielectric coefficient. The display medium with a dielectric coefficient is made of a material comprising a liquid crystal (LC) material, a luminescent material, or a combination thereof. In some cases, if the display medium with the dielectric coefficient is made of a luminescent material (e.g., a fluorescent layer and/or a phosphor layer), the display panel of the present invention is referred to as an electroluminescent (EL) display panel, and the luminescent layer made of a material comprising an organic luminescent material, a luminescent pigment, an inorganic luminescent material, other materials, or a combination thereof.

Figure 1:
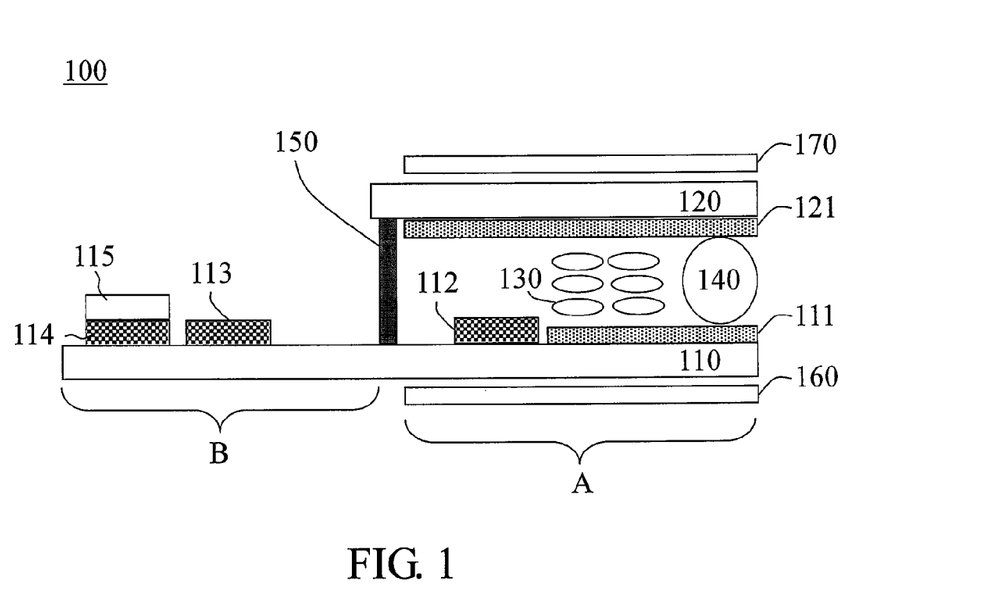
FIG. 1 is a schematic view of an embodiment of an LCD panel in accordance with the present invention.

If the display medium with a dielectric coefficient is made of an LC material, the display panel of the present invention is referred to as an LC display (LCD) panel. If the display medium with a dielectric coefficient is made of a combination of an LC material and a luminescent material, the display panel of the present invention may be referred to as an LCD panel, an EL display panel, or a hybrid display panel. An LCD panel will be used as an example hereinafter to describe the present invention. FIG. 1 shows a schematic view of an embodiment of an LCD panel in accordance with the present invention. The LCD panel 100 is primarily composed of a first substrate 110, a second substrate 120, and an LC 130 sandwiched therebetween. The first substrate 110 comprises an active region A and a peripheral region B. The active region A comprises a plurality of pixels, each of the pixels comprising a pixel electrode 111 and at least one switch element 112 electrically connected to the pixel electrode 111 (for the sake of simplicity, FIG. 1 only shows one pixel for illustration). Additionally, the switch element 112 is electrically connected to a signal line (not shown) and acts as a switch for the pixel electrode 111. Also, the signal line comprises a scan line and a data line. The pixel electrode 111 is generally made of a transparent material (e.g., indium zinc oxide (IZO), aluminum zinc oxide (AZO), aluminum tin oxide (ATO), cadmium tin oxide (CTO), cadmium zinc oxide (CZO), hafnium oxide (HfO), indium tin oxide (ITO), or other materials, or a combination thereof), a reflective material (e.g., Au, Ag, Cu, Fe, Sn, Pb, Cd, Ni, Al, Ti, Ta, Mo, Nd, Hf, W, or other materials, or a nitride thereof, an oxide thereof, an oxy-nitride thereof, or an alloy thereof, or a combination thereof), or a combination thereof.

Figure 2A:
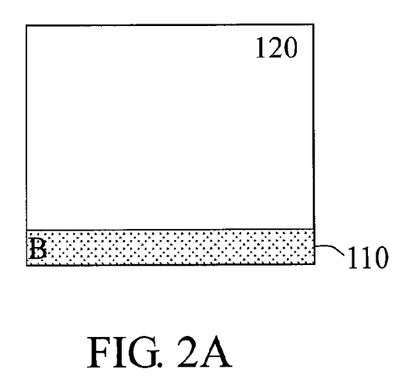
FIG. 2A to 2E are top views of the LCD panel in accordance with the present invention.
Figure 2B:
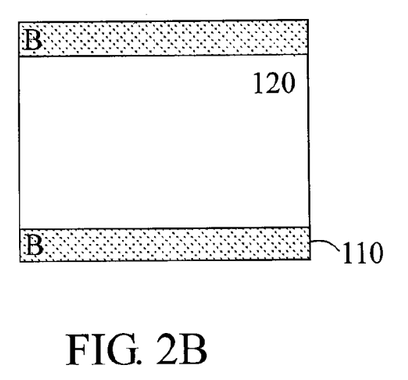
Figure 2C:
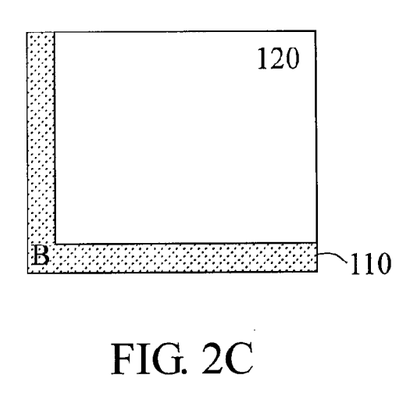
Figure 2D:
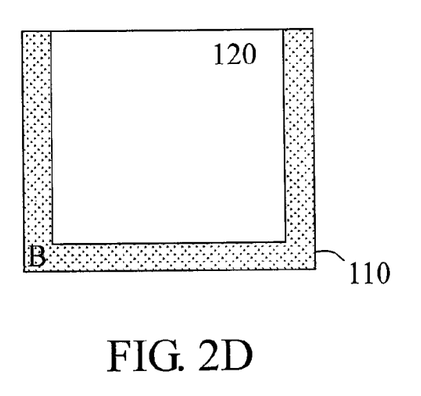
Figure 2E:
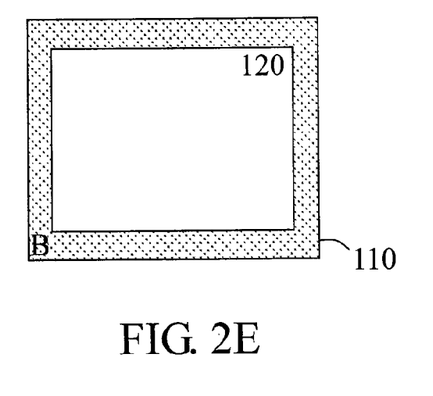

The second substrate 120 comprises a common electrode 121, which is used with the pixel electrode 111 to generate an electric field (namely, a substantially vertical electric field). The liquid crystal 130 will be reoriented at the presence of the electric field to allow light rays to transmit through the first substrate 110 to reach the second substrate 120 via the LC 130 or not to transmit through the first substrate 110. In other embodiment, the second substrate 120 does not comprise a common electrode 121, the electric field is produced by the pixel electrode 111 and other electrode (not shown) formed on the same substrate (i.e., the first substrate 110), so the electric filed is namely a substantially horizontal electric filed. The other electrode is composed of a material which is substantial identical to or different from that of the pixel electrode 111. The liquid crystal 130 will be reoriented at the presence of the electric field to allow light rays to transmit through the first substrate 110 to reach the second substrate 120 via the LC 130, or not to transmit through the first substrate 110. In another embodiment, it may include the substantially vertical field and substantially horizontal electric field at the same time. Here, the common electrode 121 is generally made of a transparent material (e.g., indium zinc oxide (IZO), aluminum zinc oxide (AZO), aluminum tin oxide (ATO), cadmium tin oxide (CTO), cadmium zinc oxide (CZO), hafnium oxide (HfO), indium tin oxide (ITO), other material, or a combination thereof), and can be selectively made of a material that is substantially the same as or different from that of the pixel electrode 111. Meanwhile, the second substrate 120 corresponds to and overlaps the active region A of the first substrate 110 and exposes the peripheral region B. FIG. 2A to FIG. 2E illustrate the exposed peripheral region B in a strip form (FIG. 2A), a dual-strip form (FIG. 2B), a substantially L form (FIG. 2C), a substantially U form (FIG. 2D), or a frame form (FIG. 2E). Additionally, in view of convenience and economical considerations in the manufacturing process of a display panel, persons having ordinary skill in the art can design any forms of the active region A and the peripheral region B as desired. Furthermore, the area of the active region A and the peripheral region B can be adjusted according to the number of the photo-sensors, as long as it will not impact the normal luminescent effect of the display panel.

Furthermore, as shown in FIG. 1, the first substrate 110 and the second substrate 120 are typically flexible substrates, for example, glass substrates (which can be thin, thickness, or have a middle thickness), quartz substrates, plastic substrates (e.g., polycarbonates, polyacrylic acids, polyacrylates, polyterephthalic acids, polyterephthalates, polyolefins, polyhaloolefins, polyethers, polyketones, other materials, or a combination thereof), substrates of other materials, or a combination thereof. A glass substrate will used as the example herein to illustrate the present invention. A spacer 140 is deposed between the two substrates, and is typically a silicide and/or an organic resin. The spacer 140 is used for controlling the space between the two substrates; in other words, for controlling the thickness of the LC 130. Furthermore, a sealant 150 is provided to encapsulate the LC 130. Preferably, the LCD panel 100 further comprises a first polarizer 160 disposed below the first substrate 110 and a second polarizer 170 disposed above the second substrate 120 to direct incident or exiting light rays in a particular direction. However, the present invention is not limited to the above case and can also provide only one polarizer on a single substrate or provide no polarizer. Additionally, in FIG. 1, the first polarizer 160 is disposed below the active region A of the first substrate 110, but the present invention is not limited to the aforesaid case since the first polarizer 160 may also be disposed below the active region A and the peripheral region B of the first substrate 110.

Figure 3:
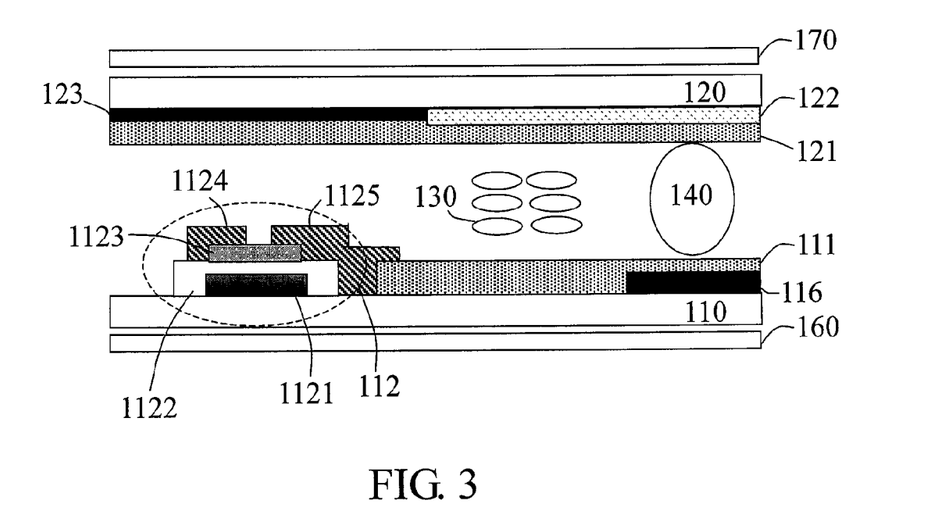
FIG. 3 is a schematic view of a detailed structure of the LCD panel shown in FIG. 1.

FIG. 3 further shows the detailed structure of the active region A of the LCD panel 100 shown in FIG. 1. In the present invention, the switch element 112 may be a thin film transistor (TFT) of a bottom-gate type (such as a back-channel etch type, an etch stop type, or other types), a top-gate type, or other types. As an exemplary embodiment of this invention, the switch element 112 shown in FIG. 3 is a TFT of bottom-gate type, which comprises a gate 1121, a gate insulation layer 1122, a semiconductor layer 1123, a source 1124, and a drain 1125. The gate 1121 may be a single layer or a multilayer structure made of a material comprising Au, Ag, Cu, Fe, Sn, Pb, Cd, Ni, Al, Ti, Ta, Mo, Nd, Hf, W, or other materials, or a nitride thereof, an oxide thereof, an oxy-nitride thereof, or an alloy thereof, or a combination thereof. The source 1124 and the drain 1125 are generally made of a material substantially the same as that of the gate 1121, but alternatively, the materials of the source 1124, drain 1125, and gate 1121 may also be different from each other. The semiconductor layer 1123 may be made of a material comprising Si-containing polycrystalline materials, Si-containing amorphous materials, Si-containing single crystalline materials, Si-containing microcrystalline materials, Ge-containing materials of the above-mentioned lattice structures, As-containing materials of the above-mentioned lattice structures, or a combination thereof. Additionally, the semiconductor layer 1123 may be in a single layer or a multilayer structure to incorporate a semiconductor layer therein without using a dopant and/or a semiconductor layer with a dopant. In the case of the single layer structure, the semiconductor layer can selectively comprises no dopant, a high concentration of dopant, a low concentration of dopant, or a combination of any two aforesaid, each of which can be arranged substantially vertically, horizontally, or a combination thereof. Similarly, in the case of a multilayer structure, each semiconductor layer can selectively comprises no dopant, a high concentration of dopant, a low concentration of dopant, or a combination of any two aforesaid, each of which can be arranged substantially vertically, horizontally, or a combination thereof. Additionally, the switch element shown in FIG. 3 is just an exemplary embodiment, which is devoid of a protection layer (not shown), and in which the gate insulation layer 1122 overlays the gate 1121, and the pixel electrode 111 is formed first on the first substrate 110 and then electrically connected with the drain 1125 formed subsequently. However, the present invention is not limited to the above case. In other embodiment, for example, the switch element may be selectively formed in such a manner that the protection layer is incorporated therein, the gate insulation layer 1122 overlays the gate 1121 and the first substrate 110, the source 1124 and the drain 1125 are formed first, followed by the formation of the pixel electrode to be electrically connected with the drain 1125. The orders and layers can be made differently (such optional manners are not shown in the figures). If the protection layer is incorporated in the switch element, at least one of the protection layer and the gate insulation layer 1122 is made of an inorganic material (e.g., silicon nitride, silicon oxide, silicon oxynitride, fluorosilicate glass, silicon carbide, or other materials, or a combination thereof), an organic material (e.g., photoresist, polyimide, polyacrylic acids, polyaromatics, polyaromatic acrylates, polyesters, polyepoxys, benzocyclobutenes, or other materials, or a combination thereof), or a combination thereof. At least one of the protection layers and gate insulation layers 1122 may selectively be a single layer or a multilayer structure. In the case of the multilayer structure, each of the layers may be made of substantially the same or a different material respectively.

Figure 4:
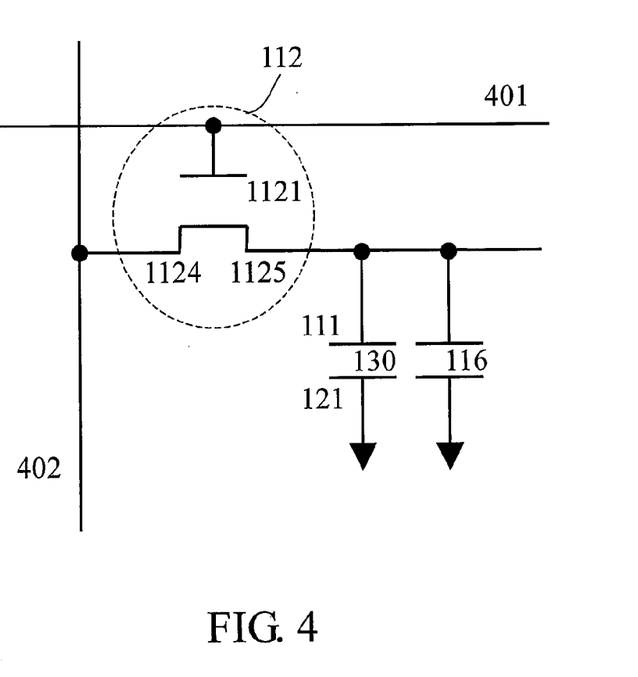
FIG. 4 is an equivalent circuit diagram of the structure shown in FIG. 3.

In FIG. 4, a driving manner for the switch element 112 will be further described hereinafter with reference to an equivalent circuit diagram of a single pixel. The scan signal is transferred to the gate 1121 via a scan line 401 and the data signal is transferred to the source 1124 via a data line 402. The switch element 112 turns on according to the operation principle of the semiconductor layer 1123, thereby, transferring the data signal to the pixel electrode 111 via the drain 1125. As a result, an electric field is generated between the pixel electrode 111 and the common electrode 121 to let the LC 130 change the arranged direction, so that the light rays can pass through the LC 130 to reach the second substrate 120 or cannot pass through the LC 130. The first substrate 110 may also comprise at least one capacitor (i.e., the element 116 shown in FIG. 3 and FIG. 4) which is connected with the LC capacitor formed between the pixel electrode 111 and the common electrode 121 to form a parallel circuit. This parallel circuit mitigates the variation of the pixel voltage due to the on/off switching operation of the switch element 112 and thereby, improves the retention performance of the LC 130. The capacitor 116 is composed of an upper electrode, a lower electrode, and an other dielectric layer (not shown) interposed therebetween. Generally, the upper electrode may be formed by the pixel electrode and/or a portion of the metal layer constituting the data line, while the lower electrode may be formed by a portion of the common line and/or a portion of the scan line. The other dielectric layer comprises at least one of the following: such as gate insulation layer, protection layer, inter-layer dielectric layer, and semiconductor layer.

As shown in FIG. 3, the second substrate 120 further comprises a color filter 122 and a black matrix 123 where the common electrode 121 overlays the color filter 122 and the black matrix 123. The color filter 122 and the black matrix 123 may be overlaid by an additional protection layer (not shown) and then by the common electrode 121. The color filter 122 consists of three color components: red, green, and blue. By controlling the light throughput with the LC 130, the color filter 122 can output various colors to achieve a full color display. However, the present invention is not limited to the above case, and other colors in the color coordinate system may be selectively adopted, for example, pink, violet, white (i.e., colorless), yellow, cyan, magenta, brown, or other colors. The black matrix 123 improves the contrast ratio and prevents light leakage and prevents photo-current generation, and is typically made of a metal membrane (e.g., Cr, Ni, Al, Mo, W, Nd, or other materials, or a combination thereof), a non-metal material (e.g., a black resin, a colored multilayer stack, a black pigment, or other materials, or a combination thereof), or a combination thereof. The color filter 122 may be optionally disposed on the first substrate 110 or the second substrate 120, while the black matrix 123 may be optionally disposed on the first substrate 110 and/or second substrate 120. For example, when the color filter 122 is disposed on the first substrate 110, it may be either formed above the switch element 112 (also known as the "COA type") or below the switch element 112 (also known as the "AOC type"). The black matrix 123 may be formed on the first substrate 110 and/or the second substrate 120.

Referring back to FIG. 1, the first substrate 110 comprises a first photo-sensor 113 and a second photo-sensor 114 in the peripheral region B. In this embodiment (that is, the second photo-sensor 114 is located in the peripheral region B), the second photo-sensor 114 comprises an invisible light spectrum-filtering layer 115. The invisible light spectrum-filtering layer 115 is made of a transparent conductive material, a predetermined material layer, or a combination thereof. In the preferred embodiment, the spectrum-filtering layer 115 should be made of a transparent conductive material, for example, indium zinc oxide (IZO), aluminum zinc oxide (AZO), aluminum tin oxide (ATO), cadmium tin oxide (CTO), cadmium zinc oxide (CZO), hafnium oxide (HfO), indium tin oxide (ITO), other materials, or a combination thereof. The predetermined material layer comprises a dielectric layer (e.g., a protection layer, a gate insulation layer, an inter-layer dielectric layer, or a combination thereof), a layer with a dielectric coefficient, a color filtering layer, a substrate, or a combination of any two aforesaid materials. Specifically, the first photo-sensor 113 is configured to detect the whole light spectrum of an environmental light comprising a visible light spectrum and an invisible light spectrum, while the second photo-sensor 114 is configured to detect the visible light spectrum of the environmental light. A photo-sensing circuit (not shown) is electrically connected to the first photo-sensor 113 and the second photo-sensor 114 to obtain a value of the invisible light spectrum (Vi) of the environmental light, wherein the Vi comprises an ultraviolet value, an infrared value, or a combination thereof. For example, if the invisible light spectrum-filtering layer 115 can filter the ultraviolet spectrum (for example, if it is an ITO layer), the photo-sensors in the display panel of the present invention may be configured to detect ultraviolet rays and provide information about the ultraviolet rays. If it can filter the infrared spectrum, the photo-sensors may be configured to detect infrared rays and provide information about the infrared rays.

Figure 5A:
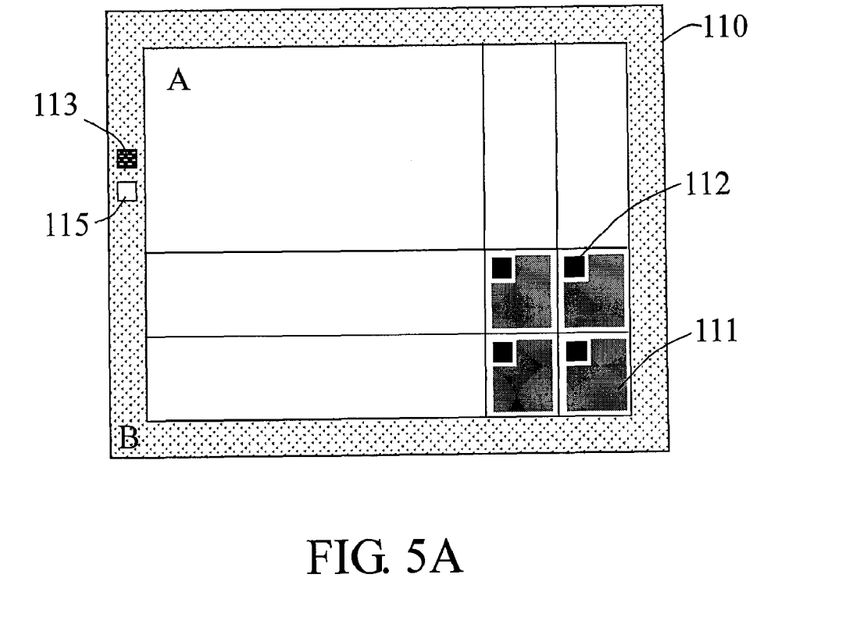
FIG. 5A to 5C are top views of a first substrate of the LCD panel in accordance with the present invention.
Figure 5B:
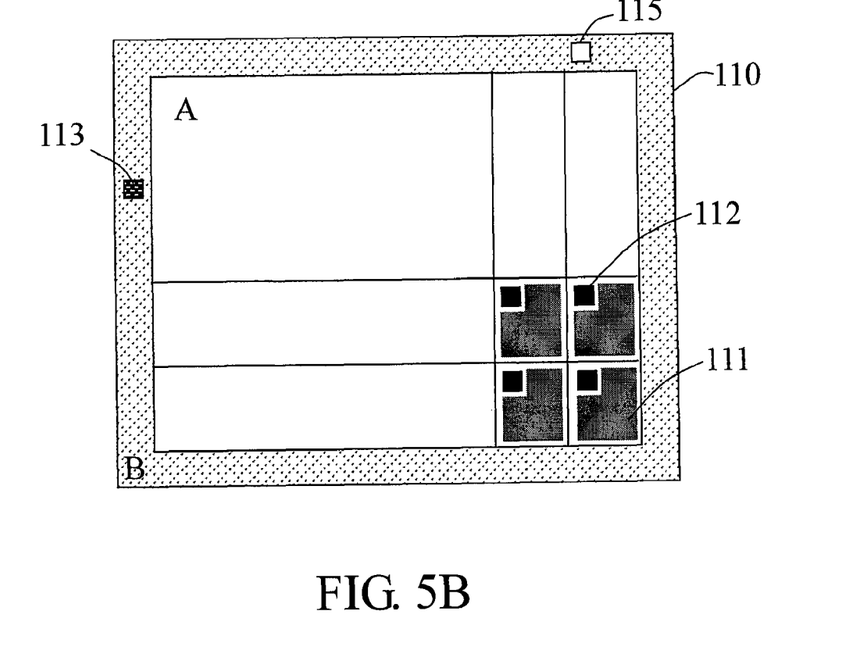
Figure 5C:
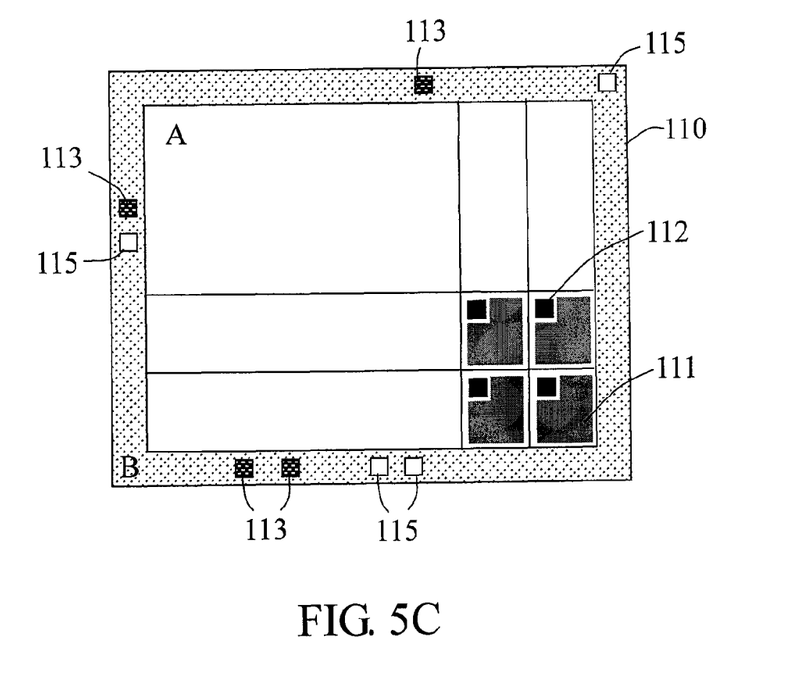

As described above, the first photo-sensor 113 and the second photo-sensor 114 may be disposed adjacently to each other on the peripheral region B of the first substrate 110 as shown in FIG. 5A. FIG. 5A shows the top view of the first substrate 110 of FIG. 1 which has a peripheral region B of a frame form as shown in FIG. 2E. Only the invisible light spectrum-filtering layer 115 overlaying the second photo-sensor 114 is visible in this figure (which is the same case in FIG. 5B and FIG. 5C). Furthermore, there may be one or more (e.g., 2, 3, 4, 5, 6, and etc.) first photo-sensors 113 and second photo-sensors 114 in FIG. 5A, and the numbers of the first photo-sensors 113 and the second photo-sensors 114 may be the same or different. Alternatively, the first photo-sensors 113 and the second photo-sensors 114 may not necessarily be disposed adjacent to each other on the first substrate 110, but instead may be disposed randomly on any appropriate locations of the peripheral region B, as shown in FIG. 5B. Moreover, the peripheral region B may optionally have at least one first photo-sensor 113 and at least one second photo-sensor 114 disposed thereon with the locations arranged optionally (with each two photo-sensors arranged adjacently to each other, or just arranged irregularly), as shown in FIG. 5C. There may also be one or more first photo-sensors 113 and second photo-sensors 114, as shown in FIG. 5B and/or FIG. 5C, and the numbers of the first photo-sensors 113 and the second photo-sensors 114 may be the same or different.

Figure 6A:
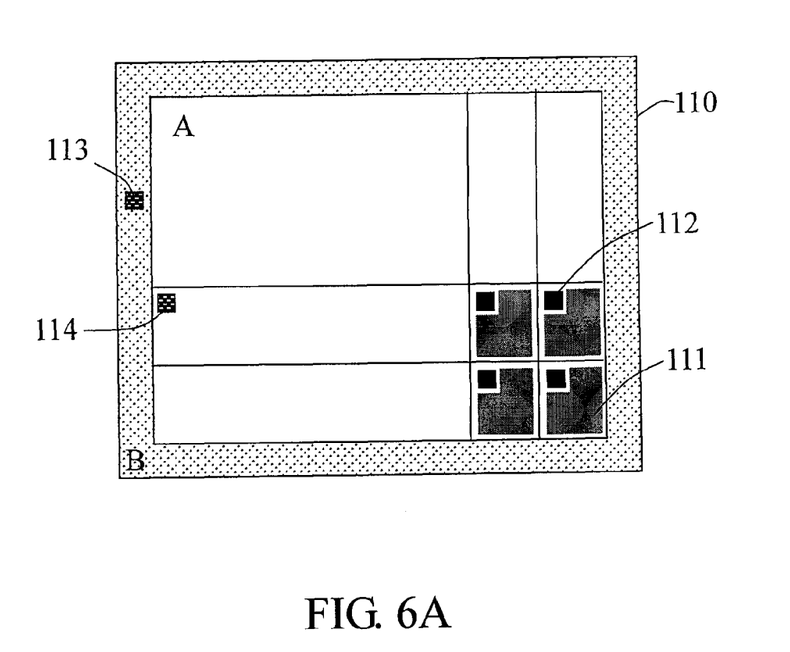
FIG. 6A and 6B are top views of a first substrate of the LCD panel in accordance with the present invention.
Figure 6B:
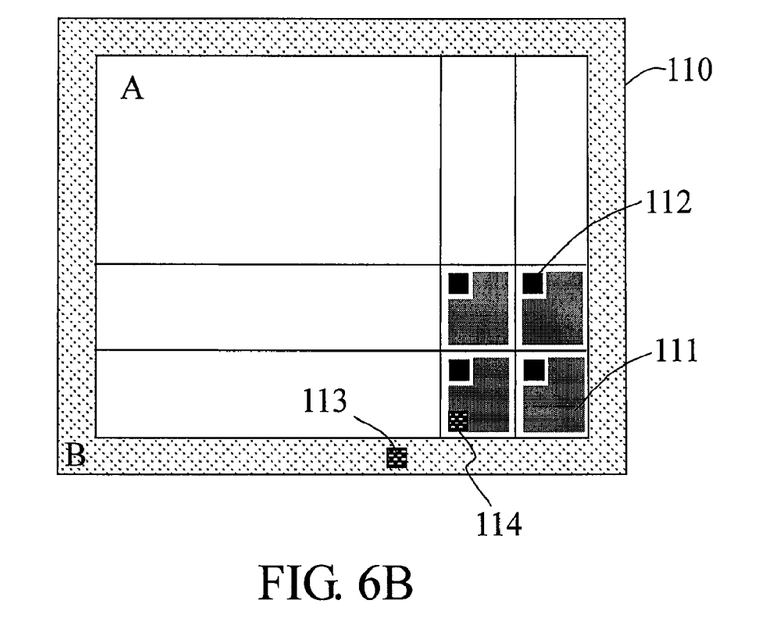

In accordance with the present invention, the second photo-sensor 114 may also be located in the active region A of the first substrate 110. As shown in FIG. 6A, at least one first photo-sensor 113 is located in the peripheral region B, while at least one second photo-sensor 114 is located in the non-pixel area or the pixel area of the active regions A. In this case, as the second substrate 120 comprises a material adapted to filter the invisible light spectrum, such as the common electrode 121 made of ITO, it is unnecessary for the second photo-sensor 114 to comprise an invisible light spectrum-filtering layer 115. However, it still does not exclude the case that the invisible light spectrum-filtering layer 115 is disposed on the second photo-sensor 114. Alternatively, the second photo-sensor 114 can be located in at least one portion of the pixel area within the active region A where the switch element 112 is located, as shown in FIG. 6B. Furthermore, there may be one or more first photo-sensors 113 and one or more second photo-sensors 114 in FIG. 6A and/or FIG. 6B, and the number of first photo-sensors 113 and second photo-sensors 114 may be the same or different. Additionally, although the second photo-sensors 114 shown in FIG. 6A and/or FIG. 6B are all disposed separately from the switch elements 112, the second photo-sensors 114 and the switch elements 112 can be selectively be disposed adjacently to each other or the second photo-sensor 114 may also function as the switch element 112; that is, the second photo-sensor 114 may have both a photo-sensing function and control function.

In accordance with the subject invention, the first photo-sensor 113 and the second photo-sensor 114 are comprised of semiconductor switch elements such as TFTs, the form of which and structure and material of layers contained therein are just as described with respect to the switch element 112 and will not be again described herein. Preferably, the first photo-sensor 113 and the second photo-sensor 114 have the same form and structure as the switch element 12. For example, the switch element 112 of a bottom-gate type TFT structure, the first photo-sensor 113, and the second photo-sensor 114 may be formed simultaneously in a TFT array manufacturing process. However, the present invention is not limited to the above case. At least one of the first photo-sensor(s) 113 and second photo-sensor(s) 114 has a type and/or structure substantially different from that of the switch element(s) 112.

Figure 7:
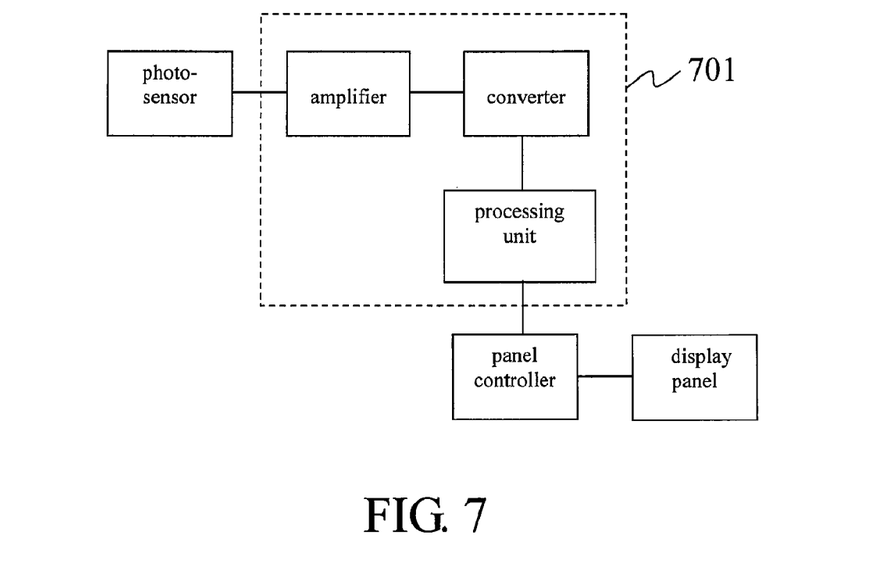
FIG. 7 is a flow diagram for displaying the value of an invisible light spectrum on a display panel in accordance with the present invention.

The photo-sensing circuit in the display panel of the present invention is electrically connected to the first photo-sensor 113 and the second photo-sensor 114, and comprises at least one processing unit, such as a comparator, an adder, a divider, an integrator, a differentiator, or a multiplier to convert the Vw of the environmental light derived from the first photo-sensor 113 and the Vi of the environmental light derived from the second photo-sensor 114 into the desired value for display on the display panel. In an embodiment of the present invention, as shown in FIG. 7, a photo-sensing circuit 701 preferably comprises at least two of the following: at least one amplifier (such as at least a signal amplifier, at least a voltage amplifier, at least a current amplifier, others, or combinations thereof), at least one converter (such as an analog/digital converter, a digital/analog converter, a digital/digital converter, an analog/analog converter, others, or combinations thereof), at least one processing unit, or other elements, or combinations thereof. For example, when the incident light from the environmental light strikes the first photo-sensor 113 and the second photo-sensor 114, a corresponding photocurrent, which is typically weak, will be generated therein as a function of light intensity. To facilitate subsequent signal processing, the photocurrent generated is first amplified in an amplifier, and the resulting amplified current is converted into a digital signal through an analog/digital converter. Next, the digital signal is processed in a processing unit to yield a desired value, such as an ultraviolet strength, an ultraviolet index, an infrared strength, an infrared index, and so on. The desired value is then provided to the panel controller for display on the panel. There can be more than one amplifier, processing unit, and converter depending on the design requirements and/or division of functions.

Accordingly, the present invention further provides a method for driving the aforesaid display panel, which comprises the following steps: (1) irradiating an environmental light on the first photo-sensor and the second photo-sensor of the display panel to detect the Vw of the environmental light and Vv of the environmental light; and (2) subsequently calculating the Vw and the Vv to obtain the Vi of the environmental light for display on the display panel.

Briefly speaking, by using a photo-sensing circuit, the value of the invisible light spectrum of the environmental light can be converted into the desired information (e.g., an invisible light index) to inform the user of the invisible light intensity in the environment. Furthermore, the value can be converted into a user-friendly message, or a combination thereof. For example, a signal lamp may be arranged on the display panel to emit green light when the ultraviolet index is still within a safe range, emit yellow light when the ultraviolet index is within an alarming range, and emit red light when the ultraviolet index goes into a dangerous range. Alternatively, colored strips, colored blocks, or colored maps may be adopted. Sounds or vibrations in various urgent/intense degrees, other manner, or a combination of the above-mentioned approaches may also be adopted. Of course, the signal lamps, the color strips, the color blocks, or the color map may also adopt colors in the color coordinate system described above.

A method for manufacturing the display panel of the present invention will be further described hereinafter with the steps for manufacturing an exemplary display panel as an example. In accordance with the present invention, the method comprises a semiconductor switch element manufacturing method for providing a first substrate. The first substrate comprises an active region and at least one peripheral region, wherein said active region has a plurality of pixels, each of which comprises at least one switch element electrically connected to a signal line. For example, in manufacturing a TFT array on a glass substrate, preparing the first substrate of the present invention generally comprises: defining a predetermined active region and a predetermined peripheral region on the glass substrate; forming a gate layer 1121 on the predetermined active region and/or predetermined peripheral region of the glass substrate and patterning it; forming a gate insulation layer 1122 (e.g., through a plasma enhanced chemical vapor deposition, but not limited thereto); forming a semiconductor layer 1123 (e.g., also through a plasma enhanced chemical vapor deposition, but not limited thereto) and patterning it; forming a source/drain layer (e.g., through a sputtering deposition, but not limited thereto) and patterning it to form a plurality of TFTs (functioning as switch elements and optionally as photo-sensors); and finally, forming a patterned pixel electrode to obtain the first substrate used in the present invention. It should be noted that, in the method for manufacturing the first substrate of the present invention, a patterned protection layer may be overlaid on the first substrate prior to the formation of the patterned pixel electrode. Additionally, the present invention is not limited to the above approach; instead, the first substrate may also be manufactured by any other appropriate manners, such as an ink jetting manner, a printing manner, other manners, or a combination thereof. Similarly, although in the above description the first substrate is manufactured through a five-stage photo-etching process, the present invention is not limited thereto. The first substrate may also be manufactured through a three-stage photo-etching process, four-stage photo-etching process, six-stage photo-etching process, seven-stage photo-etching process, eight-stage photo-etching process, and etc.

In accordance with the manufacturing method of the present invention, the switch elements and the photo-sensors can be formed together during the manufacturing of the first substrate 110. Based on the convenience and cost of the manufacturing process, in one preferred embodiment of the present invention, the switch elements have the same structure as that of the first photo-sensors and the second photo-sensors. The switch elements may also have a substantially different structure from at least one of the first photo-sensors and second photo-sensors. More specifically, if formed in the peripheral region B of the first substrate 110, the semiconductor switch element (e.g., a TFT) will function as the first photo-sensor. A semiconductor switch element (e.g., a TFT) located in the active region A that is not electrically connected with the signal line functions as the second photo-sensor, the surface of which may be optionally overlaid with an invisible light spectrum-filtering layer. If two semiconductor switch elements (e.g., TFTs) are formed in the peripheral region B, one functions as the first photo-sensor, while the other functions as the second photo-sensor and can be overlaid with an invisible light spectrum-filtering layer. In this way, the number of first photo-sensors 113 as well as the number and locations of the second photo-sensors 114 can be optionally determined. Additionally, the photo-sensors with a structure different from the switch elements may also be optionally formed on the first substrate.

The next step is to prepare the second substrate 120 which comprises a common electrode 121. For example, in manufacturing a color filter on a glass substrate, a patterned black matrix 123 is first provided on the glass substrate. Subsequently, a red material dispersed in a photosensitive resin is coated onto the substrate by, for example, spin-coating, and then is formed into a red pattern through a photolithographic process. Similarly, a green pattern and a blue pattern are formed by repeating such coating and photolithographic processes. However, the present invention is not limited to the above manners; instead, the patterns may also be prepared by any other appropriate manners, such as an ink jetting manner, a printing manner, other manners, or a combination thereof. Finally, the common electrode 121 is formed on the resulting colored layers, for example, through a vacuum sputtering process. However, the present invention is not limited thereto, and the common electrode 121 may also be formed through an ink jetting manner, a printing manner, other manners, or a combination thereof. Moreover, it should be noted that the preparation of the second substrate used in the present invention is not limited to the manner described above, but may also be prepared by any other appropriate manners.

Then, an LC layer 130 is interposed between the first substrate 110 and the second substrate 120 and encapsulated therebetween with a sealant 150. Two polarizers 160 and 170 are disposed below the first substrate 110 and above the second substrate 120, respectively. As described above, the first substrate 110 and the second substrate 120 are assembled in such a manner so that the second substrate 120 corresponds to and overlaps the active region A of the first substrate 110 and exposes the peripheral region B. Finally, an external photo-sensing circuit 701 is electrically connected with the first photo-sensor 113 and the second photo-sensor 114 on the first substrate 110, thus, accomplishing the display panel of the subject invention. Alternatively, it is optional for the photo-sensing circuit 701 to be formed directly onto the display panel through an appropriate process, and be electrically connected with the first photo-sensor 113 and the second photo-sensor 114.

Furthermore, if the abovementioned photo-sensors are formed in the peripheral region B, at least one over-layer (not shown) is preferably formed to overlay a part of these photo-sensors, to protect the photo-sensors against any interference from the environment. In such a case, the over-layer may either be a single layer or a multilayer structure, and comprises an organic material, an inorganic material, or a combination thereof. The over-layer should preferably not interfere with the photo-sensors when detect the whole light spectrum and the visible light spectrum of the environmental light.

Furthermore, for illustration, the first photo-sensor 113 used in the present invention is disposed in the peripheral region B. However, the first photo-sensor 113 is not limited to such a location, and may also be disposed in the active region A, in which case there will be no film or layer present above the first photo-sensor 113 that may affect the detection of the whole light spectrum of the environmental light.

As described above, the present invention provides a relatively simpler method for manufacturing a display panel provided with photo-sensors, which eliminates the need for an additional manufacturing process to manufacture the photo-sensor and also eliminates the use of an external devices acting as a photo-sensor in the prior art.

Figure 8:
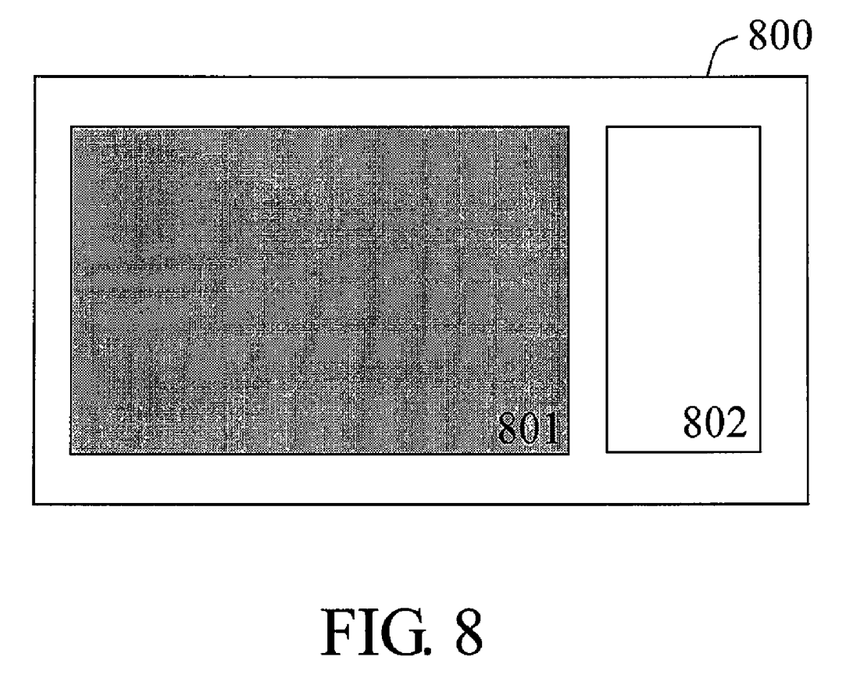
FIG. 8 is a schematic view of an electro-optical device in accordance with the present invention.

FIG. 8 depicts a schematic view of an electro-optical device 800 in accordance with the present invention. As shown in FIG. 8, the display panel 801 described in the above embodiment may be electrically connected with an electronic element 802 to constitute an electro-optical device 800. The electronic element 802 comprises, for example, a control element, an operating element, a processing element, an input element, a memory element, a driving element, a light emitting element, a protecting element, a sensing element, a detecting element, or other functional devices, or a combination thereof. The type of electro-optical device comprises a portable product (e.g., a mobile phone, a video camera, a camera, a laptop, a game console, a watch, a music player, an email transceiver, a map navigator, a digital photograph, or a similar product), a video/audio product (e.g., a video/audio player or a similar product), a display screen, a TV set, a indoor/outdoor billboards, a panel in a projector, and etc. In the case that the display panel of the above embodiment of the present invention is an LCD panel, it may be classified as the following types according to at least one of the configurations of the pixel electrode and LC molecules: a transmissive type, a transflective type, a reflective type, a vertical alignment (VA) type, an in-plane switching (IPS) type, a multi-domain vertical alignment (MVA) type, a twisted nematic (TN) type, a super twisted nematic (STN) type, a pattern vertical alignment (PVA) type, a super pattern vertical alignment (S-PVA) type, an advanced super view (ASV) type, a fringe field switching (FFS) type, a continuous pinwheel alignment (CPA) type, an axial symmetric microcell (ASM) type, an optical compensation bend (OCB) type, a super in-plane switching (S-IPS) type, an advanced super in-plane switching (AS-IPS) type, an ultra fringe field switching (UFFS) type, a macromolecular stable alignment type, a dual-view type, a triple-view type, other types, or a combination thereof. If the display panel in the above embodiment is an electroluminescent display panel, it may be classified by the nature of the display medium with a dielectric coefficient into an organic electroluminescent display panel, an inorganic electroluminescent display panel, or a combination thereof. Accordingly, the method for manufacturing such an electro-optical device comprises the method for manufacturing the display panel described above and the manufacturing processes of various electro-optical devices. As the final step, the assembly of the display panel will finish the fabrication of the electro-optical device.

As understood by persons skilled in the art, the above disclosure is related to the preferred embodiments of the present invention, but is not intended to limit the scope of the claims. Any equivalent modifications and replacements without departing from the spirit of the disclosure of the present invention should be covered in the following claims as appended.

What is claimed is:

1. A display panel comprising:
    a first substrate with an active region and at least one peripheral region, said active region comprising a plurality of pixels, and each of the pixels comprising at least one switch element electrically connected to a signal line;
    a second substrate corresponding to and overlapping the active region so as to expose the peripheral region, and comprising a common electrode thereon;
    a display medium with a dielectric coefficient disposed between the first substrate and the second substrate;
    at least one first photo-sensor disposed on the peripheral region and composed of a first semiconductor switch element, said first photo-sensor(s) being adapted to detect a whole light spectrum of an environmental light with a visible light spectrum and an invisible light spectrum;
    at least one second photo-sensor disposed on the first substrate and composed of a second semiconductor switch element, said second photo-sensor(s) being adapted to detect the visible light spectrum of the environmental light; and
    a photo-sensing circuit electrically connected to the first photo-sensor(s) and the second photo-sensor(s), said photo-sensing circuit being adapted to obtain a value of the invisible light spectrum (Vi) of the environmental light.

2. The panel of claim 1, wherein the at least one second photo-sensor is disposed on the active region.

3. The panel of claim 1, wherein the at least one second photo-sensor is disposed on the peripheral region.

4. The panel of claim 2, wherein the at least one second photo-sensor is coated with at least one invisible light spectrum-filtering layer.

5. The panel of claim 3, wherein the at least one second photo-sensor is coated with at least one invisible light spectrum-filtering layer.

6. The panel of claim 1, further comprising a color filter disposed on one of the first substrate and the second substrate.

7. The panel of claim 6, further comprising a black matrix disposed on one of the first substrate and the second substrate.

8. The panel of claim 4, wherein the invisible light spectrum-filtering layer comprises a transparent conductive material, a predetermined material layer, or a combination thereof.

9. The panel of claim 5, wherein the invisible light spectrum-filtering layer comprises a transparent conductive material, a predetermined material layer, or a combination thereof.

10. The panel of claim 1, further comprising a first polarizer and a second polarizer disposed on the lower surface of the first substrate and the upper surface of the second surface, respectively.

11. The panel of claim 1, wherein the photo-sensing circuit comprises at least one processing unit.

12. The panel of claim 1, wherein the photo-sensing circuit comprises at least one of at least one amplifier and at least one converter.

13. The panel of claim 1, wherein the Vi comprises an ultraviolet value, an infrared value, or a combination thereof.

14. An electro-optical device comprising the display panel of claim 1.

15. A method for driving a display panel, said display panel comprises a first substrate with an active region and at least one peripheral region, said active region comprising a plurality of pixels, and each of the pixels comprising at least one switch element electrically connected to a signal line; a second substrate corresponding to and overlapping the active region so as to expose the peripheral region, and comprising a common electrode thereon; a display medium with a dielectric coefficient disposed between the first substrate and the second substrate; at least one first photo-sensor disposed on the peripheral region and composed of a first semiconductor switch element, said first photo-sensor(s) being adapted to detect a whole light spectrum of an environmental light with a visible light spectrum and an invisible light spectrum; at least one second photo-sensor disposed on the first substrate and composed of a second semiconductor switch element, said second photo-sensor(s) being adapted to detect the visible light spectrum of the environmental light; and a photo-sensing circuit electrically connected to the first photo-sensor and the second photo-sensor, method comprising:

irradiating an environmental light on the first photo-sensor(s) of the display panel and the second photo-sensor(s) of the display panel to detect a value of a whole light spectrum (Vw) of the environmental light and a value of a visible light spectrum (Vv) of the environmental light; and calculating the Vw and the Vv to obtain a value of an invisible light spectrum (Vi) of the environmental light and show it on the display panel.

16. A method for manufacturing a display panel, the method comprising:

providing a first substrate with an active region and at least one peripheral region, said active region having a plurality of pixels, and each of the pixels comprising at least one switch element electrically connected to a signal line;

providing a second substrate corresponding to and overlapping the active region so as to expose the peripheral region, and comprising a common electrode thereon;

disposing a display medium with a dielectric coefficient between the first substrate and the second substrate;

disposing at least one first semiconductor switch element on the peripheral region as at least one first photo-sensor adapted to detect a whole light spectrum of an environmental light with a visible light spectrum and an invisible light spectrum;

disposing at least one second semiconductor switch element on the first substrate as at least one second photo-sensor adapted to detect a visible light spectrum of the environmental light; and providing a photo-sensing circuit electrically connected to the first photo-sensor(s) and the second photo-sensor(s), so as to obtain a value of the invisible light spectrum of the environmental light (Vi).

17. The method of claim 16, wherein the at least one second photo-sensor is disposed on the active region.

18. The method of claim 16, wherein the at least one second photo-sensor is disposed on the peripheral region.

19. The method of claim 17, wherein the at least one second photo-sensor is coated with at least one invisible light spectrum-filtering layer.

20. The method of claim 18, wherein the at least one second photo-sensor is coated with at least one invisible light spectrum-filtering layer.

21. The method of claim 16, further comprising disposing a color filter on one of the first substrate and the second substrate.

22. The method of claim 21, further comprising disposing a black matrix on one of the first substrate and the second substrate.

23. The method of claim 16, further comprising disposing a first polarizer and a second polarizer on the lower surface of the first substrate and the upper surface of the second surface respectively.

24. The method of claim 16, wherein the Vi comprises an ultraviolet value, an infrared value, or combinations thereof.

25. A method for manufacturing an electro-optical device comprising the method of claim 16.

* * * * *